United States Patent [19]
Sasaki et al.

[11] Patent Number: 5,569,320
[45] Date of Patent: Oct. 29, 1996

[54] PROCESS FOR PREPARING REFRACTORY MOLDED ARTICLES AND BINDERS THEREFOR

[75] Inventors: Nobuyoshi Sasaki; Tetsuya Yokokawa, both of Yokohama; Yoshikazu Hashimoto, Tokyo; Yoshiro Ohta, Kawasaki; Hideo Sekiguchi, Tokyo, all of Japan

[73] Assignees: Cadic Corporation; KSP Inc.; Tama Chemicals Co., Ltd., all of Kanagawa-ken, Japan

[21] Appl. No.: 365,111

[22] Filed: Dec. 28, 1994

[30] Foreign Application Priority Data

Dec. 28, 1993 [JP] Japan .................................. 5-354148
Jul. 13, 1994 [JP] Japan .................................. 6-183048

[51] Int. Cl.$^6$ .................................................. C09K 3/00
[52] U.S. Cl. .................... 106/287.26; 106/287.16; 106/287.17; 106/287.18; 106/287.19; 106/38.2; 106/38.35; 501/127; 501/128; 501/133
[58] Field of Search ................... 106/287.16, 287.17, 106/287.18, 287.19, 287.26, 38.35, 38.2; 501/127, 128, 133

[56] References Cited

U.S. PATENT DOCUMENTS

| | | | |
|---|---|---|---|
| 4,712,605 | 12/1987 | Sasaki et al. | 164/516 |
| 4,834,165 | 5/1989 | Egoshi et al. | 164/14 |
| 4,919,193 | 4/1990 | Sasaki | 164/516 |
| 4,921,038 | 5/1990 | Sasaki et al. | 164/516 |
| 5,271,768 | 12/1993 | Morishima et al. | 106/287.1 |
| 5,382,383 | 1/1995 | Hirai et al. | 252/501.1 |
| 5,433,941 | 7/1995 | Patel | 424/50 |

FOREIGN PATENT DOCUMENTS

| | | |
|---|---|---|
| 0207864 | 7/1987 | European Pat. Off. . |
| 0255441 | 3/1988 | European Pat. Off. . |
| 63-49343A | 3/1988 | Japan . |
| 63-171245 | 7/1988 | Japan . |
| 1-293939 | 11/1989 | Japan . |
| 88/01991 | 3/1988 | WIPO . |

*Primary Examiner*—David Brunsman
*Attorney, Agent, or Firm*—Birch, Stewart, Kolasch & Birch, LLP

[57] ABSTRACT

This invention provides a process for preparing a refractory molded article comprising the steps of (a) forming a molded article matrix from an aggregate and the first binder, (b) impregnating the molded article matrix formed in step (a) with the second binder consisting of an alcoholic solution of one kind or two or more kinds of metal alkoxides selected from alkoxides of metals of Group 4A or Group 4B (excepting carbon) and Group 3A or Group 3B of the periodic table and their partial hydrolysates and an alkaline compound of alkali metal or alkaline earth metal (one kind or a mixture of two or more kinds selected from alkoxides, hydroxides and salts of the metal) and (c) drying and firing the molded article matrix at high temperature and also provides a binder for the preparation of such refractory molded article. The invention provides a process for preparing a refractory molded article and a binder with advantages such as casting of a molten metal without generation of gases and prevention of such defects as blow holes, good flow of a molten metal enabling thin-wall casting of steel, reduced requirement of riser in steel casting compared with cold casting, good dimensional precision, wide applicability to materials ranging from light alloy to steel, and an inner part for adjustment of strength and improvement of crumbling characteristics.

21 Claims, 5 Drawing Sheets

PROCESS FOR PREPARING REFRACTORY MOLDED ARTICLES AND BINDERS THEREFOR

FIELD OF THE INVENTION AND RELATED ART STATEMENT

This invention relates to a process for preparing refractory molded articles, particularly of high-temperature strength, suitable for molds by bonding aggregates such as siliceous sand and alumina with binders and to binders used directly in the practice of said process.

According to the conventional processes, ceramic molded articles (for example, ornaments) are manufactured by forming molded article matrixes with the use of organic binders, degreasing and sintering them. It was necessary in such processes to use a physical means to prevent the molded article matrixes from deforming in the course of degreasing and sintering. Because of especially high sintering temperatures employed (approximately 1,200° C.), the conventional processes required a relatively long firing cycle and experienced difficulty to improve productivity.

The resin shell mold process has been known as one of representative casting processes. This process has a number of advantages such as the following. ① Coated sand with high flow makes it possible to prepare a mold of complicated shape with precision. ② Coated sand can be stored for a prolonged period of time. ③ The molds exhibit high strength and the steps for their transport and assembly can be mechanized. ④ The molds can be formed at high speed. ⑤ The prepared molds show good storage stability. ⑥ The molds decompose at high temperature and readily crumble after casting. On account of these advantages, this process is adopted widely in many areas such as cast iron articles in the automotive and other industries.

Although the resin shell mold process has an advantage of high productivity in the preparation of molds, resins used as binders burn to generate gases during casting and at times develop serious defects such as blow holes. Moreover, the molds do not have sufficiently high heat resistance to allow reduction of the wall thickness to the desired degree in the case of casting steel. The resins (thermosetting phenolic resins) present as binders in coated sand burn during casting and this causes recarburizing of steel cast in the molds with the resultant deterioration of the properties of the cast steel articles.

A casting process which utilizes organic self-curing binders (for example, phenols, furans, and urethanes) is also well known for the preparation of molds, but the molds using the self-curing binders will develop the same defects as those of the resin shell mold process.

OBJECT AND SUMMARY OF THE INVENTION

This invention has been worked out in the light of the aforementioned problems and its underlying thought is to form a molded article matrix with the use of an organic binder, impregnate the molded article matrix with a binder for refractory molded article use consisting of specified metal alkoxides and an alcoholic solution of an alkaline compound and convert the binder to an inorganic binder in the firing step.

Accordingly, an object of this invention is to provide a process for preparing a mold (ceramic molded article) useful for thin-wall casting of carbon steel and stainless steel with incorporation of the "high-temperature mold" process which is generally practiced in precision casting and consists of casting a molten metal into a mold preheated at high temperature.

Another object of this invention is to provide a process for preparing a mold which effects casting of a molten metal without generation of gases to prevent occurrence of casting defects such as blow holes, maintains good flow of a molten metal for thin-wall casting of steel, minimizes the deterioration of properties due to such factors as recarburizing resulting from the burning of organic binders during casting of steel, reduces the requirement of riser during casting and is suitable for practicing the high-temperature mold process.

A still another object of this invention is to provide a process for preparing a mold which undergoes minimal shrinkage in the step for conversion from an organic binder to an inorganic binder and exhibits excellent dimensional precision.

A further object of this invention is to provide a process for preparing a wide variety of molds which possess high strength in a wide temperature range from low temperature to high temperature and are useful for casting materials ranging from light alloy to steel.

A still further object of this invention is to provide a binder for refractory molded articles which is useful for the preparation of a variety of molds such as the aforementioned high-temperature molds with excellent properties and other molds, cores, and refractory molded articles such as ornaments, art works, and sanitary wares.

According to this invention, the aforementioned objects can be attained by a manufacturing process consisting of the following steps:

(a) A step for forming a molded article matrix from an aggregate and the first binder;

(b) A step for impregnating the molded article matrix formed in the aforementioned step (a) with the second binder which consists of an alcoholic solution of one kind or two or more kinds of metal alkoxides selected from alkoxides of metals of Group 4A or Group 4B (excepting carbon) and Group 3A or Group 3B of the periodic table and their partial hydrolysates and an alkaline compound of alkali metal or alkaline earth metal (one kind or a mixture of two or more kinds selected from alkoxides, hydroxides and salts) and hydrolyzing the impregnated molded article matrix; and (c) A step for drying the molded article matrix and firing at high temperature.

The resulting refractory molded article may be used as a mold or core and a step for sintering at high temperature can be added after the high-temperature firing for further improvement of the strength.

A mold with a core for investment casting can be prepared by a manufacturing process consisting of the following steps:

(a) A step for forming a core matrix from an aggregate and the first binder;

(b) A step for impregnating the core matrix formed in the aforementioned step (a) with the second binder which consists of an alcoholic solution of one kind or two or more kinds of metal alkoxides selected from alkoxides of metals of Group 4A or Group 4B (excepting carbon) and Group 3A or Group 3B of the periodic table and their partial hydrolysates and an alkaline compound of alkali metals or alkaline earth metal and hydrolyzing the impregnated core matrix;

(c) A step for forming a lost model by positioning the core matrix in a mold and casting a lost model material into the mold;

(d) A step for coating the lost model alternately with a slurry and stucco particles a plurality of times to form a refractory layer and drying the coated lost model;

(e) A step for making the lost model vanish; and (f) A step for simultaneously firing the aforementioned core matrix and refractory layer.

That is, the core and the master mold (outer form) are fired simultaneously in the process for preparing a refractory molded article consisting of a mold with a core.

The first binder may be organic (thermosetting resins, self-curing resins) or inorganic (water glass). The hydrolysis of the binders may be effected by water in the atmosphere, water from a humidifier or water in an aqueous alcohol. Where the product is a mold, a molten metal can be cast into the mold while hot after the high-temperature firing. After cooling, the mold can also be used as a core in ordinary casting (green sand mold, gravity casting, low-pressure casting and die casting).

Binders useful for the process in question are alcohols containing 1 to 50% by weight as converted to metal oxide of one kind or two or more kinds of alcohol-soluble metal alkoxides of the following general formula $R_m M^1(OR)_{4-m}$ or $M^2(OR)_3$ (wherein $M^1$ designates a metal of Group 4A or Group 4B excepting carbon of the periodic table, $M^2$ designates a metal of Group 3A or Group 3B of the periodic table, R designates mutually identical or different alkyl group with 1 to 6 carbon atoms, aryl group with 6 to 8 carbon atoms, alkoxyalkyl group with 2 to 6 carbon atoms or aryloxyalkyl group with 7 to 12 carbon atoms, m is an integer from to to 3 when $M^1$ is Si and m is zero when $M^1$ is other than Si) or their partial hydrolysates and 1 to 16% by weight as converted to metal oxide of alcohol-soluble alkaline compounds of the following general formula $M^3 OR'$ or $M^4(OR')_2$ (wherein $M^3$ designates an alkali metal, $M^4$ designates an alkaline earth metal and R' designates hydrogen or alkyl group with 1 to 6 carbon atoms) as binder components.

In this invention, the metal alkoxides constituting the binder components are alkoxides of the metals $M^1$ of Group 4A or Group 4B excepting carbon of the periodic table or the metals $M^2$ of Group 3A or Group 3B of the periodic table or partial hydrolysates of these metal alkoxides.

Examples of $M^1$ forming metal alkoxides are Ti and Zr for the metals of Group 4A, Si, Ge, Sn and Pb for the metals of Group 4B excepting carbon, and examples of $M^2$ are Sc and Y for the metals of Group 3A and B, Al and Ga for the metals of Group 3B.

The R groups forming the aforementioned metal alkoxides are mutually identical or different alkyl groups with 1 to 6 carbon atoms, aryl groups with 6 to 8 carbon atoms, alkoxyalkyl groups with 2 to 6 carbon atoms or aryloxyalkyl groups with 7 to 12 carbon atoms. Concrete examples are methyl, ethyl, propyl, isopropyl, amyl, hexyl, cyclohexyl, butyl, isobutyl, t-butyl and s-butyl for the alkyl groups; phenyl, tolyl, and xylyl for the aryl groups; methoxyethyl, methoxyisopropyl, methoxypropyl, methoxybutyl, ethoxyethyl, ethoxypropyl and ethoxybutyl for the alkoxyalkyl groups; and phenoxymethyl, phenoxyethyl, phenoxypropyl, phenoxybutyl, tolyloxymethyl, tolyloxyethyl, tolyloxypropyl and tolyloxybutyl for the aryloxyalkyl groups.

There is no specific limitation to the partial hydrolysates of the aforementioned metal alkoxides as long as they show a degree of hydrolysis of 55% or less and are soluble in alcohols. The partial hydrolysates may be linear, of a network structure or cyclic.

The metal alkoxides consisting of the aforementioned metal alkoxides and their partial hydrolysates may be used singly or as a mixture of two or more.

In this invention, the most desirable among the aforementioned metal alkoxides are one kind or two or more kinds of silicate esters and alkylsilicate esters of the general formula $R_m Si(OR)_{4-m}$ (wherein R is mutually identical or different alkyl group with 1 to 6 carbon atoms, aryl group with 6 to 8 carbon atoms, alkoxyalkyl group with 2 to 6 carbon atoms or aryloxyalkyl group with 7 to 12 carbon atoms and m is an integer from 0 to 3) and their partial hydrolysates for the reason that they are the components of casting sand and bond readily with sand.

Concrete examples of tetraalkoxysilanes are tetramethoxysilane, tetraethoxysilane, tetrapropoxysilane, tetraisopropoxysilane, tetrabutoxysilane, methoxytriethoxysilane, dimethoxydiethoxysilane, ethoxytrimethoxysilane, methoxytriisopropoxysilane, dimethoxydiisopropo xysilane and methoxytributoxysilane and those of alkyltrialkoxysilanes are methyltrimethoxysilane, methyltriethoxysilane, methyltripropoxysilane, methyltriisopropoxysilane, methyltributoxysilane, ethyltrimethoxysilane, ethyltriethoxysilane and ethyltriisopropoxysilane.

Examples of dialkyldialkoxysilanes are dimethyldimethoxysilane, dimethyldiethoxysilane, dimethyldipropoxysilane, dimethyldiisopropoxysilane, dimethyldibutoxysilane, diethyldimethoxysilane, diethyldiethoxysilane and diethyldiisopropoxysilane and those of trialkylalkoxysilanes are trimethylmethoxysilane, trimethylethoxysilane, trimethylpropoxysilane, trimethylisopropoxysilane, trimethylbutoxysilane, triethylmethoxysilane, triethylethoxysilane and triethylisopropoxysilane.

Examples of aryloxysilanes are tetraphenoxysilane and tetratolyloxysilane and those of alkylaryloxysilanes are methyltriphenoxysilane, ethyltriphenoxysilane, dimethyldiphenoxysilane, diethyldiphenoxysilane and methyltritolyloxysilane.

Furthermore, examples of alkoxyalkylsilanes are tetramethoxymethylsilane, tetramethoxyethylsilane, tetramethoxyisopropylsilane, tetraethoxymethylsilane, tetraethoxyethylsilane and tetraethoxyisopropylsilane and those of aryloxyalkylsilanes are tetraphenoxymethylsilane, tetraphenoxyethylsilane, tetraphenoxypropylsilane, tetraphenoxyisopropy lsilane and tetratolyloxyethylsilane.

Other desirable metal alkoxides include trimethoxyborine, triethoxyborine, tetrabutoxytitanium, tetrabutoxyzirconium and triisopropoxyaluminum.

The content of these metal alkoxides as converted to metal oxide (for example, converted to $SiO_2$ where the metal oxides are silicate esters) is 1 to 50% by weight, preferably 4 to 30% by weight. With a content of less than 1% by weight, refractory molded articles become short of metal oxides originating from the metal alkoxides and do not develop the desired strength (for example, 10 kg/cm$^2$ or more, preferably 30 kg/cm$^2$ or more) required for handling of molds. On the other hand, with a content of more than 50% by weight, the solubility of alkaline compounds becomes less than 0.5% by weight and the desired strength is not obtained.

As for the alkaline compounds which are other components of binders, the metals $M^3$ include lithium, sodium and potassium, preferably sodium and potassium. The substituent group R' which forms alkoxides with the alkali metals is, for example, hydrogen, an alkyl group with 1 to 6 carbon atoms such as methyl, ethyl, propyl, isopropyl, butyl, pentyl, hexyl, and cyclohexyl, phenyl, tolyl, an alkoxyalkyl group or an aryloxyalkyl group. The alkaline compounds may be used singly or as a mixture of two or more.

The content of the alkaline compounds as converted to metal oxide (for example, converted to $Na_2O$ where the metal in an alkali compound is sodium) is 0.5 to 16% by weight, preferably 1 to 10% by weight. With a content of less than 0.5% by weight, refractory molded articles become short of metal oxides originating from the metal alkoxides and do not develop the desired strength (for example, 10 $kg/cm^2$ or more, preferably 30 $kg/cm^2$ or more). On the other hand, with a content of more than 16% by weight, the solubility of $SiO_2$ becomes less than 1% by weight and the desired strength is not obtained.

Alcoholic solvents to dissolve the aforementioned binder components, that is, metal alkoxides and alkaline compounds, include methyl alcohol, ethyl alcohol, propyl alcohol, isopropyl alcohol, butyl alcohol, isobutyl alcohol, amyl alcohol, hexyl alcohol, cyclohexyl alcohol, ethylene glycol, diethylene glycol, propylene glycol, ethyl cellosolve, methyl cellosolve, propyl cellosolve, butyl cellosolve, phenyl methyl cellosolve and phenyl ethyl cellosolve. It is possible to incorporate other additives into binders of this invention for various purposes. For example, alkaline or neutral surfactants such as sodium dodecylbenzensulfonate and polyethylene glycol alkyl aryl ether are added for the purpose of improving impregnation characteristics.

A wide variety of refractory molded articles can be prepared with the use of binders of this invention as long as the following steps are applicable to their preparation; a step for forming a molded article matrix from an aggregate and a binder for matrix (first binder), a step for impregnating the molded article matrix with a binder of this invention followed with removal or non-removal of the alcoholic solvent in the binder, a step for hydrolyzing the binder components in the impregnated molded article matrix and a step for drying and firing the molded article matrix. Concrete examples of such articles are fired molds and cores for green sand mold casting, molds and cores for shell mold casting, cores for investment casting which is one kind of precision casting, molds and cores for ceramic mold casting, cores for gravity die casting and pressure die casting, etc., refractory articles such as ornaments, art works and sanitary wares and ceramics-related products.

Aggregates useful for the formation of molded article matrixes are not restricted and include siliceous sand, alumina, quartz, zircon, fused silica, silica flour, mullite, synthetic mullite, chamotte and synthetic chamotte. Depending upon the end uses of the refractory molded articles to be prepared, one kind or two or more kinds of the aforementioned aggregates is suitably selected and used in practice.

Binders for molded article matrix to be used with the aforementioned aggregates are not restricted either. For example, organic binders are thermosetting resins such as phenolic resins to be used in shell mold casting, self-curing urethane resins, furan resins and phenolic resins while inorganic binders are water glass and colloidal silica. Depending upon the end uses of the refractory molded articles to be prepared, one kind or two or more kinds of the aforementioned binders is suitably selected and used in practice.

The process for forming a molded article matrix from the aforementioned aggregate and binder is not restricted and one of known processes can be adopted.

The impregnation of a molded article matrix with a binder of this invention may be effected, for example, by one of the following processes; an "impregnation-drainage process" which consists of immersing a molded article matrix in a binder, taking the matrix out of the binder and draining the binder, an "impregnation-drainage-drying" process which is a combination of the impregnation-drainage process and a subsequent drying step for removal of an alcoholic solvent and which may be repeated a plurality of times as needed, a process for impregnating a molded article matrix with a binder under reduced pressure and a process for spraying a binder in a shower.

The binder components present in a molded article matrix are hydrolyzed, for example, as follows; by leaving them in the atmosphere, by leaving them at a temperature of 30° to 80° C. and a humidity of 40 to 100% for a specified length of time, by introducing steam in a pressurizing chamber at 1 to 7 $kg/cm^2$, by immersing in an aqueous alcohol or by immersing in an aqueous solution containing a surfactant. Upon completion of the hydrolysis, the molded article matrix is dried by a suitable method and fired at 600° C. or more, preferably at 1,000° to 1,100° C., to yield a refractory molded article.

A distinct feature of this invention is the use of, for example, a sodium alcoholate or sodium hydroxide, for the introduction of an alkaline compound into partial hydrolysates of an alkyl silicate or aryl silicate in an alcoholic solvent. It is possible to dissolve a sodium alcoholate which is a strong alkali homogeneously without hydrolyzing metal alkoxides such as alkyl silicates and aryl silicates.

The mechanism for the curing of binders in this invention is not clear and is surmised as follows.

1. Sodium alcoholate and alkyl silicate, for example, sodium ethylate ($C_2H_5ONa$) and ethyl silicate respectively, in required amounts are mixed with an alcohol.

2. The hydrolysis proceeds as follows to yield NaOH and $SiO_2$.

$C_2H_5ONa+H_2O \rightarrow C_2H_5OH+NaOH$ 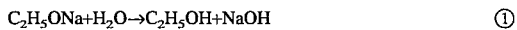

$(RO)_3Si[O—Si(OR)_2]_nOR+(n+2)H_2O \rightarrow (n+1)SiO_2+2(n+2)C_2H_5OH(R=C_2H_5—)$ 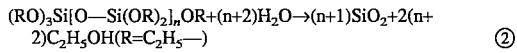

3. The NaOH and $SiO_2$ resulting from the hydrolysis react as follows under heat to yield $Na_2O.SiO_2$ which contributes to enhance the high-temperature strength.

$2NaOH+SiO_2 \rightarrow Na_2O.SiO_2+H_2O$ 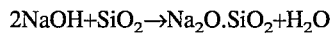

After the hydrolysis, the strength of binder is gradually replaced from 200° C. upward by the strength of $SiO_2$ formed in the hydrolysis of the alkyl silicate. From 400° C. upward $Na_2O.SiO_2$ forms gradually and contributes to increase the strength at high temperature. Hydrolysis takes place during firing in the case where an organic binder is used for a molded article matrix, or some water is generated during firing and this supposedly makes it possible to omit the hydrolysis step which uses a heating and humidifying apparatus such as autoclave before the aforementioned firing step.

High strength of refractory molded articles are likely attained as follows according to this invention. A binder of this invention for refractory molded article use (second binder), on account of its being an alcoholic solution, efficiently impregnates a molded article matrix formed from an aggregate and a binder (first binder), the metal alkoxides in the binder generate metal oxides during hydrolysis and subsequent drying, the alkaline compounds in the binder also generate metal oxides, and the metal oxides originating from the metal alkoxides and those from the alkaline compounds become mutually bonded to the aggregate during firing to develop high strength.

According to this invention, as described above, a molded article matrix containing the first organic binder can be converted to an inorganic molded article matrix by impregnation with the second binder followed by firing at high temperature thereby increasing the strength in a range from low temperature to high temperature. This increase in strength either eliminates or simplifies a physical means to prevent molded articles from deforming during firing or sintering. In addition, the temperature for firing (sintering) is lower than that in the conventional processes and the productivity improves.

A core molded by this process generates a reduced amount of gases during casting and it can be used as it is in green sand mold casting, metal mold casting and die casting. Moreover, this process can minimize defects during casting such as blow holes. In particular, the strength of molded articles, molds and cores increases further when sintered at higher temperature.

According to this invention, it is possible to fire a core and a master mold simultaneously by using a core impregnated with the second binder. This can shorten the manufacturing step for molds for precision casting.

Aggregates useful for this invention are siliceous sand, mullite, alumina, quartz and zircon and the first binder to be mixed with these aggregates may be organic or inorganic.

The second binder is designed to comprise metal alkoxides including alkyl silicates or aryl silicates and alkaline compounds consisting of sodium alcoholates and the ratio of these components is desirably chosen to roughly correspond to the ratio of $Na_2O$ to $SiO_2$ after hydrolysis. The hydrolysis may be effected by water in the atmosphere, water from a humidifier or water in an aqueous alcohol.

In the preparation of a mold by the process of this invention, it is naturally desirable to cast a molten metal immediately after firing of the mold at high temperature as casting into a high-temperature mold improves the flow of a molten metal and enables the preparation of thin-walled articles. Casting of thin-walled stainless steel products is possible.

A typical embodiment of the process for the preparation of refractory molded articles with the use of binders of this invention will be described in detail below with reference to the drawings.

Figure 1:
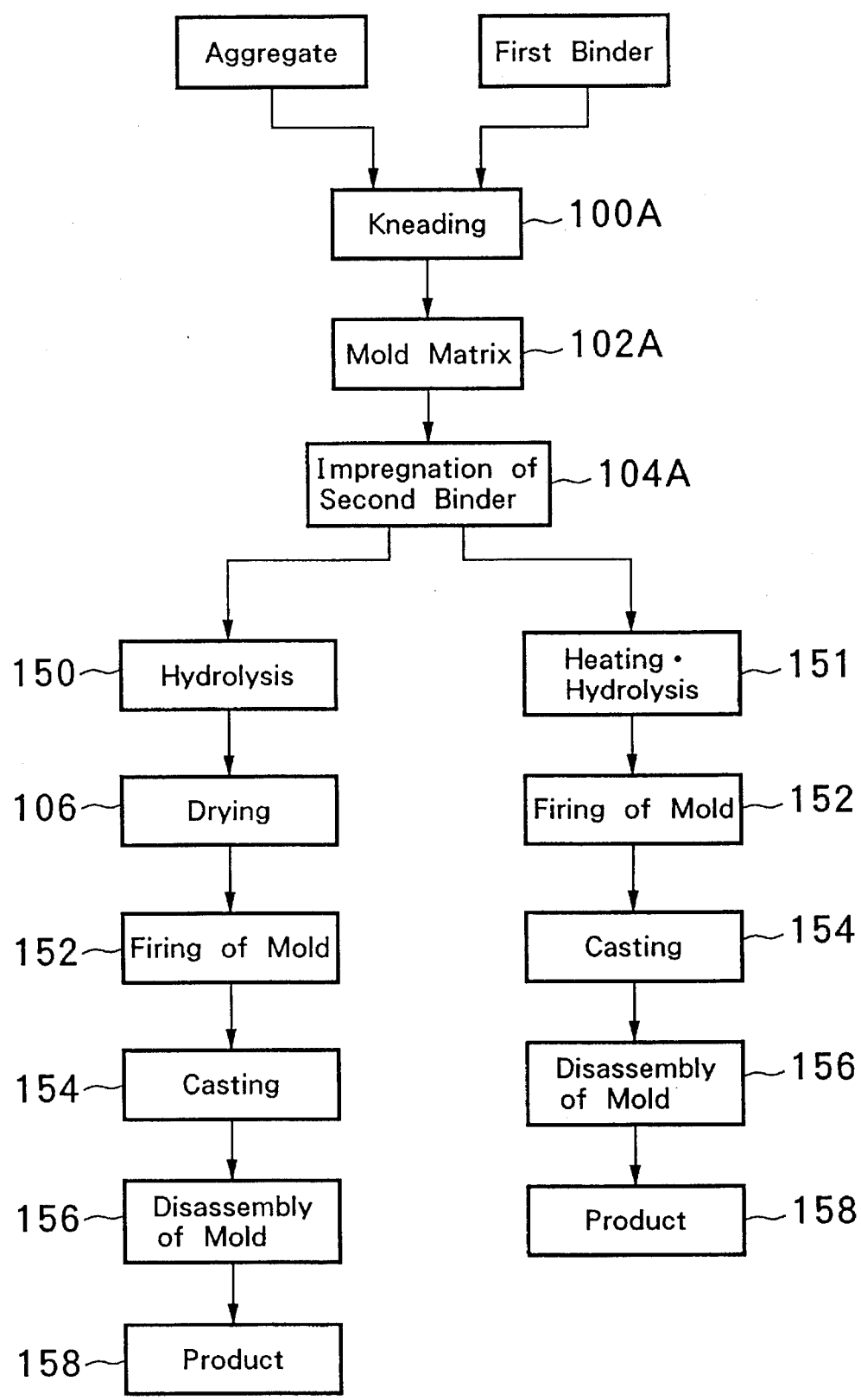
FIG. 1 is a flow diagram illustrating the process for preparing a high-temperature mold.

FIG. 1 is a flow diagram illustrating an example of the process for preparing a high-temperature mold according to this invention. An aggregate and an organic binder (first binder), the principal materials for the mold, are kneaded first (FIG. 1, Step 100A).

Siliceous sand is used, for example, as an aggregate. Preferable siliceous sand is No. 8 specified in JIS G5901 (1954). Zircon sand, alumina or fused silica may be used. Phenolic resin, for example, is used as organic binder in an amount of approximately 2% of the total weight of the principal materials and a kneaded compound is molded by the common shell mold process (Step 102A).

The mold thus formed is immersed in the second binder for about 10 minutes (Step 104A). The second binder here consists of sodium ethylate and ethyl silicate mixed simultaneously with alcohol in amounts capable of forming 2% $Na_2O$ and 12% $SiO_2$ respectively as converted to oxide.

The mold is then immersed in aqueous alcohol for 10 minutes to effect hydrolysis (Step 150) and dried (Step 106). In the cases where an organic binder which generates water by heating is used as the first binder, the water thus generated alone can effect the hydrolysis (Step 151) and the drying step is not necessary in this case.

The mold is fired at 1,000° C. for 1 hour to yield a ceramic mold (Step 152). While the ceramic mold is at 1,000° C. immediately after the firing, molten steel of 1,600° C. is cast into the mold (Step 154). After cooling, the mold is disassembled to yield the product (Step 158).

According to the example of FIG. 1, it becomes feasible to apply high-temperature firing to coated sand containing a thermosetting resin, a resin hitherto used widely for binder, as the first binder. The conventional coated sand cures at approximately 200° C., but could not be fired at high temperature (approximately 1,000° C.). According to this invention, however, impregnation of the surface of the mold matrix with the second binder followed by hydrolysis can impart a sufficiently high strength at high temperature. It thus becomes feasible to cast a molten metal immediately after firing at high temperature (approximately 1,00° C.) and to cast thin-walled products.

The process is described above for the preparation of a mold in the example of FIG. 1, but it can also be applied to the preparation of a core alone.

Figure 2:
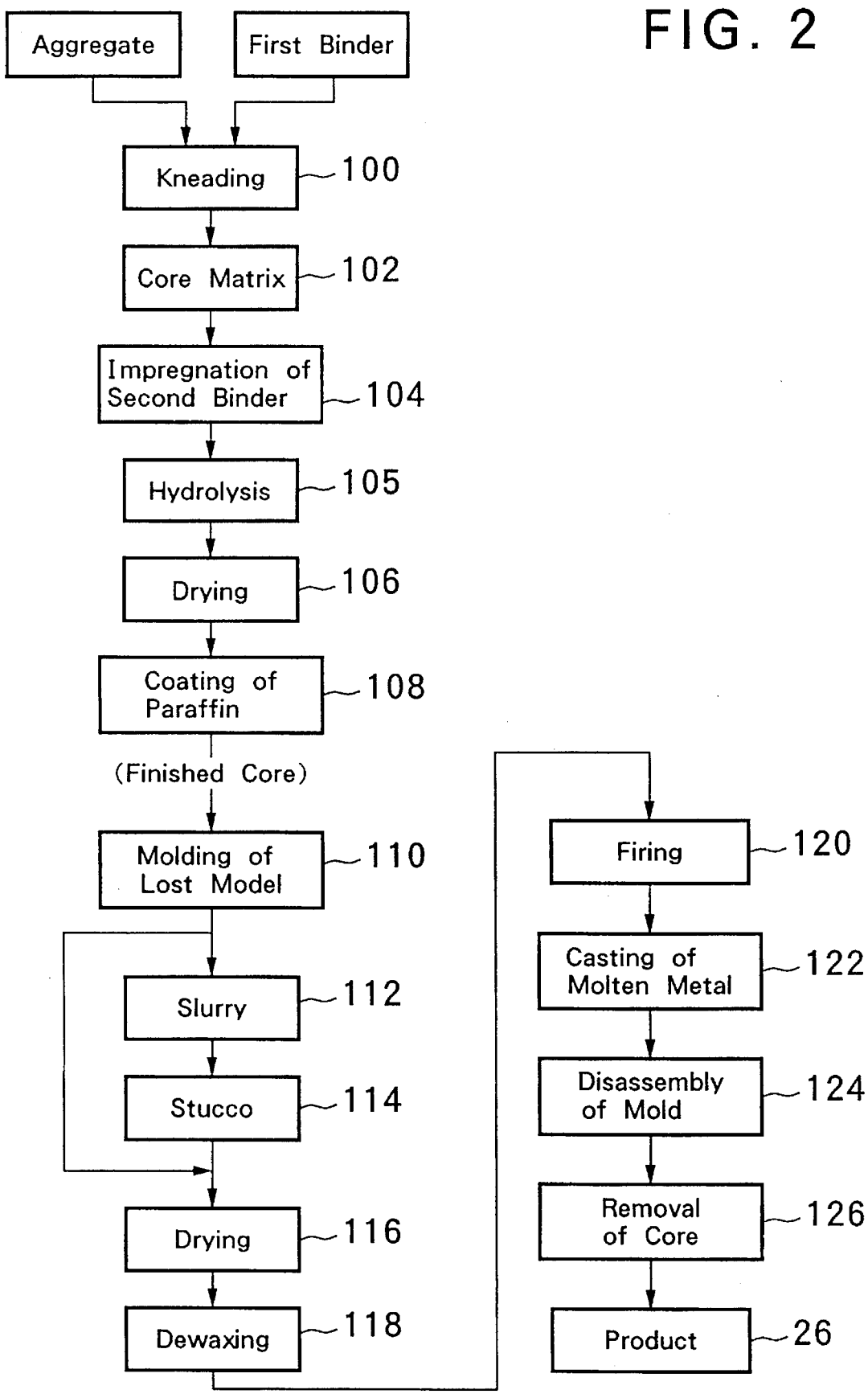
FIG. 2 is a flow diagram illustrating the process for preparing a mold with a core by using a binder of this invention for refractory molded article use.
Figure 3A:
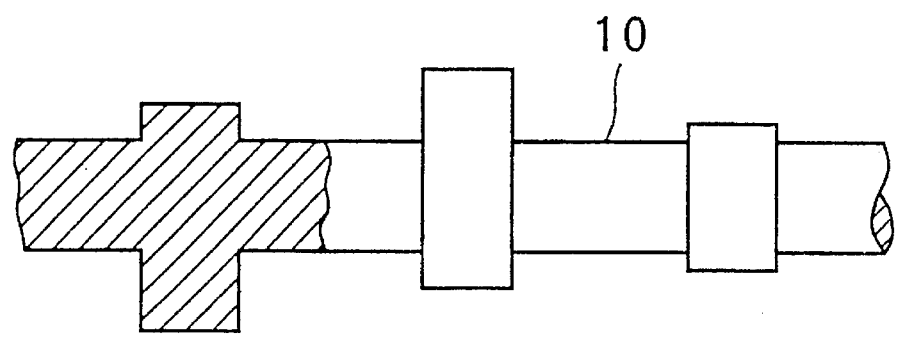
FIGS. 3A–3C illustrate the first half of the process shown in FIG. 2.

FIG. 2 is a diagram illustrating the process for preparing a mold with a core according to this invention and FIGS. 3 and 4 are illustrations of the first half and the second half of the process respectively.

An aggregate and an organic binder (first binder), the principal raw materials for the core, are kneaded first. The aggregate is, for example, a mixture of the following:

| | |
|---|---|
| Siliceous sand | 90% by weight |
| Silica flour | 10% by weight |

Preferable siliceous sand is No. 8 specified in JIS G5901 (1954).

A thermosetting resin such as phenolic resin may be used as the first binder. The first binder of this type is widely used in the resin shell mold process and cures at approximately 200° C. with sufficient strength at low to medium high temperature. This binder, however, loses its strength at high temperature such as encountered during firing.

Figure 3B:
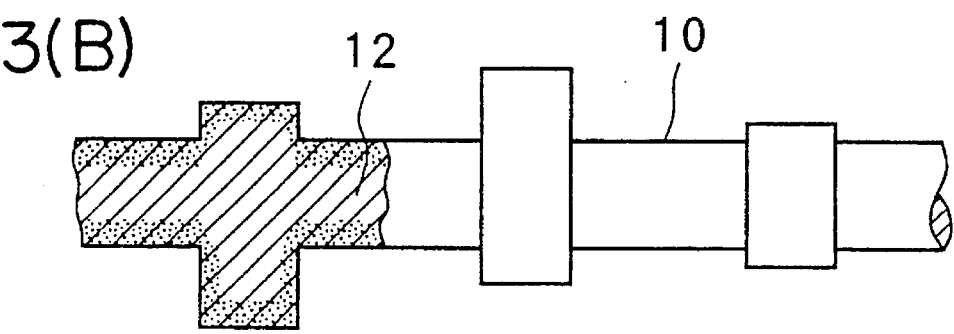
Figure 3C:
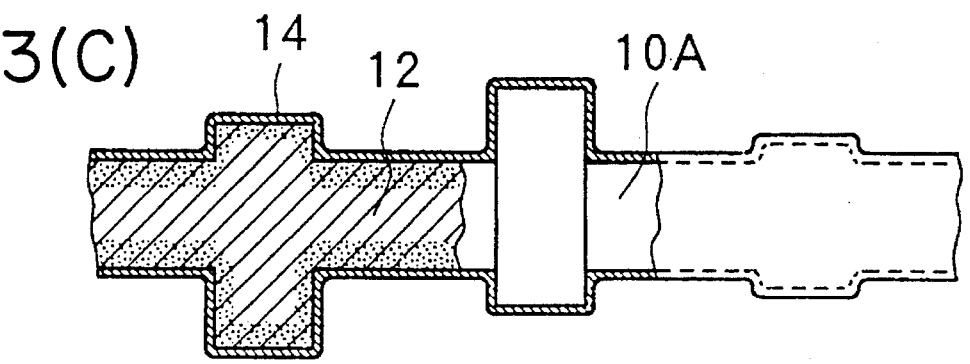
Figure 4D:
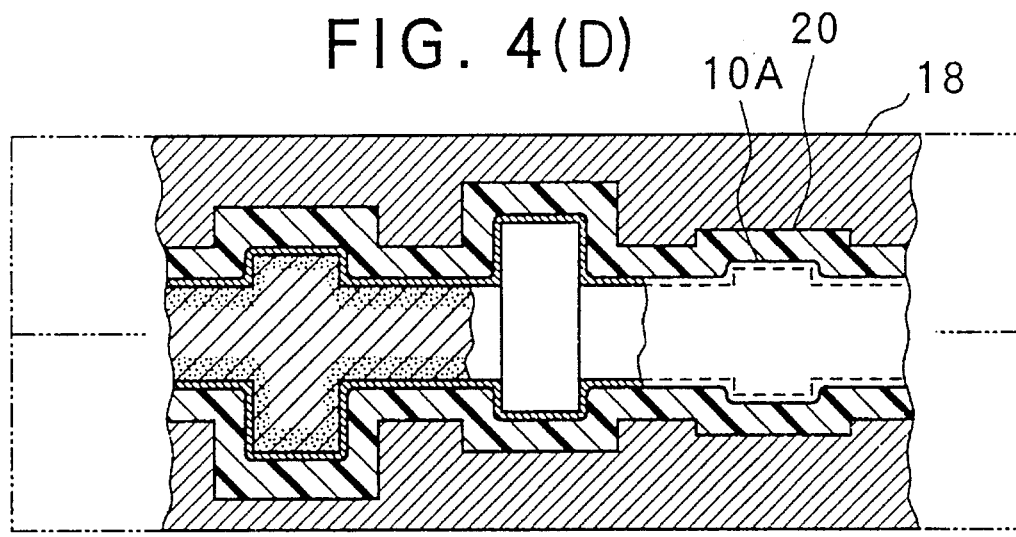
FIGS. 4D–4F illustrate the second half of the process shown in FIG. 2.

The core matrix 10 is immersed in the second binder for about 10 minutes to form an impregnating layer 12 (Step 104, FIG. 3B). The impregnated core matrix is immersed in aqueous alcohol for 10 minutes to hydrolyze the binder components. The second binder is a mixture of sodium alcoholate, polyethyl silicate and anhydrous alcohol. This binder infiltrates the core matrix 10 to a suitable depth from the surface and acts to increase the hot strength.

The first binder to be mixed with the aggregate in the aforementioned Step 100 normally maintains enough strength up to 250° C. or so, but rapidly loses the strength above 300° C. The second binder to be applied in the Step 104 here acts to give the core enough hot strength at a temperature from 250° to 1,000° C.

The core matrix 10 impregnated with the binder is dried (Step 106). The dried core matrix 10 is coated with paraffin wax (Step 108, FIG. 3C). The coating is carried out by melting paraffin wax at 80° to 90° C. and immersing the core matrix 10 impregnated with the second binder in the molten wax for 1 minute or so.

A wax layer 14 formed on the surface prevents the crumbling of the core matrix 10 and it also serves to increase the strength to prevent damages to the core in transport and prevents the core from absorbing moisture during storage. The wax layer 14 is effective for improving the moldability of wax patterns in the following step.

The core 10A is completed by impregnating the core matrix 10 with the binder and forming the wax layer 14 over the binder-impregnated layer 12. The core 10A is fixed inside the metal mold 18. A material for forming a lost model such as wax and foamed polystyrene is injected into the mold 18 to form a lost model 20 (Step 110, FIG. 4D).

Figure 4E:
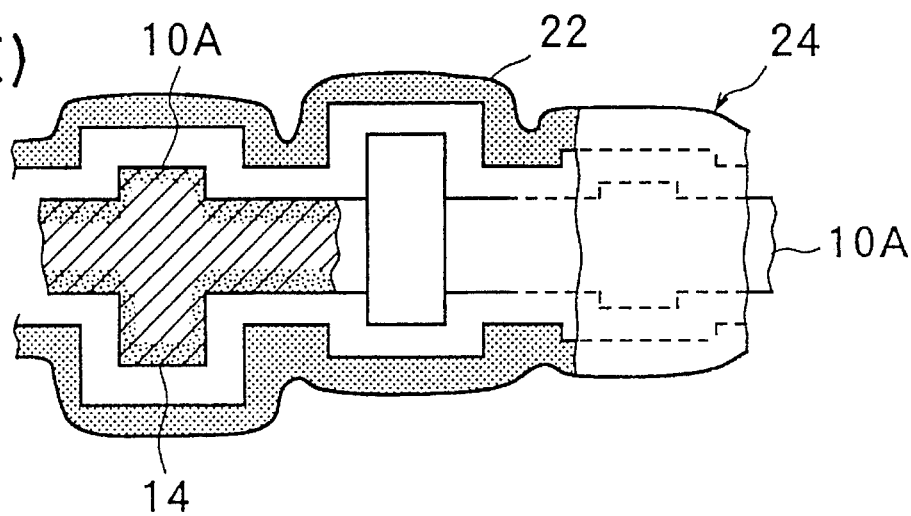

The outer surface of the lost model 20 enveloping the core 10A is coated with a refractory material. The lost model is immersed in a slurry container (Step 112) and sprinkled with stucco particles (Step 114) and this procedure is repeated a plurality of times to form a refractory layer 22 with a specified thickness (FIG. 4E). The refractory material here may be the same as that used as aggregate for the core matrix 10. The refractory layer 22 is dried sufficiently (Step 116) and the lost model 20 is dewaxed (Step 118) and fired (Step 120).

The wax layer 14 of the core 10A vanishes as a result of dewaxing and the binder-impregnated layer 12 becomes exposed on the surface. The firing affects both the refractory layer 22 on the outside and the core 10A stripped of the wax layer 14 simultaneously. As a result, a ceramic shell mold 24 containing the core matrix 10 and the binder-impregnated layer 12 is obtained (FIG. 4E).

The dewaxing (Step 118) is effected by heating in high-temperature steam in an autoclave and the hydrolysis of the second binder in the binder-impregnated layer 12 takes place in this step. The thermal reaction described earlier in relation to the surmised curing mechanism takes place in the subsequent firing to increase the strength of the binder-impregnated layer 12.

The core 10A and the refractory layer 22 are fired, after the hydrolysis in the autoclave and the drying, at about 800° to 1,000° C. for 0.5 to 20 hours and the step for casting of a molten metal follows while at this high temperature. The temperature and time for the firing step naturally vary with the thermal expansion coefficient of the aggregate in use.

In the step for casting of a molten metal, a molten metal such as steel of approximately 1,600° C. is cast into the cavity inside the mold 24 defined by the refractory layer 22 and the binder-impregnated layer 12. After cooling, the mold is disassembled (Step 124) and the core 10A is removed (Step 126).

Figure 4F:
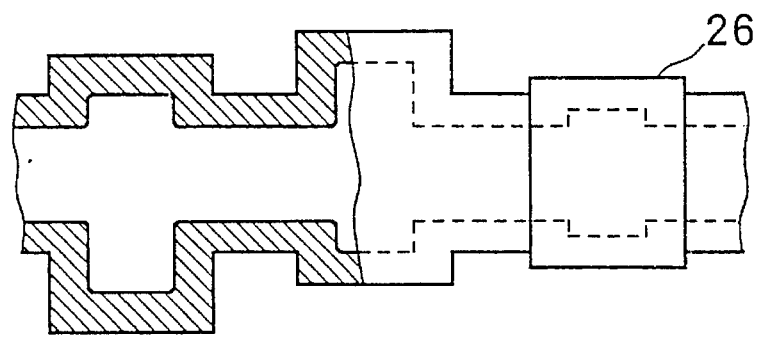

In the removal of the core 10A and the refractory layer 22, the major portion of the core 10A is removed by such physical means as vibration or impact and the remainder is dissolved by immersing in fused caustic soda. The finished product 26 results (FIG. 4F).

Figure 5:
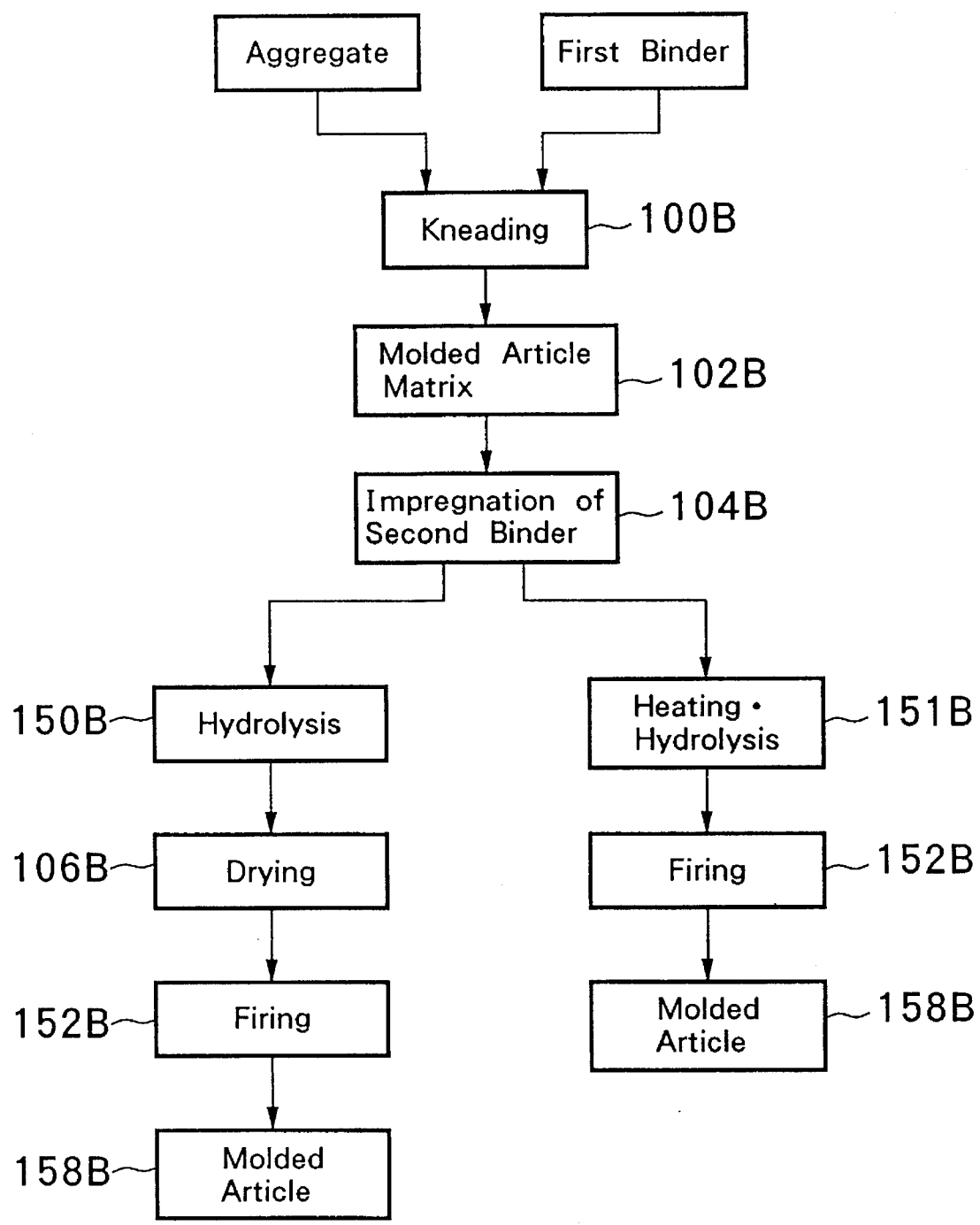
FIG. 5 is a flow diagram illustrating the process for preparing ceramic molded articles other than molds (for example, ornaments).

FIG. 5 is a diagram illustrating an example of a process for preparing ceramic molded articles other than molds (for example, ornaments). The only difference between FIG. 5 and FIG. 4 is that the step for forming a mold matrix in FIG. 1 (Step 102A) is replaced with a step for forming molded article matrix (Step 102B) in FIG. 5. Therefore, the number identifying the step in FIG. 1 is suffixed with B and given in FIG. 5 without further explanation.

A mold or a core prepared by the process shown in FIG. 5 can be given sufficient strength for the use in metal mold casting and die casting. The molded article in FIG. 5 can be fired at high temperature, for example at 1,100° C. or more, to increase the strength. In this case, it is possible to obtain a ceramic core usable singly in investment casting.

DETAILED DESCRIPTION OF THE PREFERRED EMBODIMENTS

This invention will be described in detail below with reference to the accompanying examples and comparative examples.

EXAMPLE 1

Into a 2-l enclosable mixer was introduced 369.5 g of Ethyl Silicate 40 [Ethyl Silicate 40; $SiO_2$ content 40.6%, viscosity 4.8 C.P. (25° C.)], 319.4 g of isopropyl alcohol and 311.1 g of 28% by weight methanol solution of $NaOCH_3$ were added, and the mixture was agitated with a stirrer for 30 minutes in an enclosed condition to yield the binder of Example 1 for refractory molded article use.

The concentrations of the metal alkoxide and the alkaline compound in the binder of Example 1 were 15% by weight of $SiO_2$ and 5% by weight of $Na_2O$ respectively as converted to metal oxide.

A test piece (molded article matrix) measuring 10 mm×10 mm×50 mm was molded from zircon-coated sand (No. 7 sand containing 2% by weight of phenolic resin).

The test piece was immersed in the aforementioned binder of Example 1 in an enclosed condition at room temperature for 30 minutes, taken out and drained for 5 minutes.

The test piece thus obtained was immersed in aqueous alcohol (60%) for 10 minutes to hydrolyze the binder in the test piece and dried at 80° C. for 60 minutes.

The test piece was placed in a firing furnace maintained at 1,000° C., fired at 1,000° C. for 1 hour, allowed to cool to room temperature, taken out of the furnace and tested for its deflective strength, which was 60 kg/cm². The deflective strength was determined in accordance with JIS-K-6910. The size of the test piece was as given above.

EXAMPLE 2

Into a 2-l enclosable mixer was introduced 382.3 g of Methyl Silicate 51 [Methyl Silicate 51; $SiO_2$ content 51.0%, viscosity 4.86 C.P. (25° C.)], 53.8 g of isopropyl alcohol and 563.9 g of 28% by weight methanol solution of $NaOCH_3$ were added, and the mixture was agitated with a stirrer for 30 minutes in an enclosed condition to yield the binder of Example 2 for refractory molded article use.

The concentrations of the metal alkoxide and the alkaline compound in the binder of Example 2 were 19.5% by weight of $SiO_2$ and 9% by weight of $Na_2O$ respectively as converted to metal oxide.

A test piece (molded article matrix) measuring 10 mm×10 mm×50 mm was molded from zircon-coated sand (No. 7 sand containing 2% by weight of phenolic resin).

The test piece was immersed in the aforementioned binder of Example 2 in an enclosed condition at room temperature for 30 minutes, taken out and drained for 5 minutes.

The test piece thus obtained was exposed first to the condition where the temperature was 30° C. and the humidity was 95% for 1.5 hours and then to the condition where the temperature was 80° C. and the humidity was 95% for 2.5 hours to hydrolyze the binder in the test piece and dried at 80° C. for 60 minutes.

The test piece was placed in a firing furnace maintained at 1,000° C., fired at 1,000° C. for 1 hour, allowed to cool to room temperature, taken out of the furnace and tested for its deflective strength, which was 70 kg/cm$^2$. The deflective strength was determined in accordance with JIS-K-6910. The size of the test piece was as given above.

EXAMPLE 3

The same Ethyl Silicate 40 (200 g) as used in the aforementioned Example 1 was introduced into a 2-l enclosable mixer, 100 g of isopropyl alcohol was added, the mixture was agitated with a stirrer in an enclosed condition for 10 minutes, and the Ethyl Silicate 40 was hydrolyzed and thereafter held enclosed for 6 hours to give a solution of the ethyl silicate which was 30% hydrolyzed.

The solution of the hydrolyzed ethyl silicate was mixed with 355.1 g of a 21% by weight ethanol solution of NaOC$_2$H$_5$ and 344.9 g of isopropyl alcohol and the mixture was agitated with a stirrer in an enclosed condition for 30 minutes to yield the binder of Example 3 for refractory molded article use.

The concentrations of the metal alkoxide and the alkaline compound in the binder of Example 3 were 8.1% by weight of SiO$_2$ and 3.4% by weight of Na$_2$O respectively as converted to metal oxide.

A test piece was prepared as in the aforementioned Example 1, immersed in the aforementioned binder of Example 3 in an enclosed condition for 30 minutes, taken out of the binder, drained for 5 minutes and dried at 80° C. for 60 minutes. The procedure of impregnation and drying was repeated here and the test piece was subjected to hydrolysis, drying and firing, allowed to cool to room temperature, taken out of the furnace, and tested for dimensional changes after hydrolysis and drying and for the deflective strength. The dimension was measured with the aid of a caliper (accuracy 0.05 mm) and the average of three points was determined. The dimensional change was and the deflective strength was 80 kg/cm$^2$.

EXAMPLE 4

The same Ethyl Silicate 40 (100 g) as used in the aforementioned Example 1 was introduced into a 0.5-l enclosable mixer, 50 g of isopropyl alcohol was added, the mixture was agitated with a stirrer or in an enclosed condition for 10 minutes, and the Ethyl Silicate 40 was hydrolyzed and thereafter held enclosed for 6 hours to give a solution of the ethyl silicate which was 25% hydrolyzed.

Separately, 100 g of the Methyl Silicate 51 as used in the aforementioned Example 2 was introduced into a 0.5-l enclosable mixer, 50 g of isopropyl alcohol was added, the mixture was agitated with a stirrer in an enclosed condition for 10 minutes, and the Methyl Silicate 51 was hydrolyzed and thereafter held in an enclosed condition for 6 hours to yield a solution of the methyl silicate which was 25% hydrolyzed.

The aforementioned two solutions thus prepared were mixed, further hydrolyzed and thereafter held in an enclosed condition for 6 hours to yield a solution of the silicates which were 30% hydrolyzed.

The solution (178.7 g) was mixed with 143.1 g of a 28% by weight methanol solution of NaOCH$_3$ and 678.2 g of isopropyl alcohol, the mixture was agitated with a stirrer in an enclosed condition for 30 minutes to yield a binder of Example 4 for refractory molded article use.

The concentrations of the metal alkoxides and the alkali metal alkoxide in the binder of Example 4 were 5.3% by weight of SiO$_2$ and 2.3% by weight of Na$_2$O respectively as converted to metal oxide.

A test piece was prepared as in the aforementioned Example 3 with the use of the binder of Example 4 and tested for its dimensional change and deflective strength, which was 0.3% and 85 kg/cm$^2$ respectively.

EXAMPLE 5

The same Ethyl Silicate 40 (369.5 g) as used in the aforementioned Example 1 was introduced into a 2-l enclosable mixer, 319.4 g of isopropyl alcohol and 311.1 g of a 28% by weight methanol solution of NaOCH$_3$ were added and the mixture was agitated with a stirrer in an enclosed condition for 30 minutes to yield a binder of Example 5 for refractory molded article use.

The concentrations of the metal alkoxide and the alkaline compound in the binder of Example 5 were 15% by weight of SiO$_2$ and 5% by weight of Na$_2$O respectively as converted to metal oxide.

A test piece measuring 10 mm×10 mm×50 mm (molded article matrix) was molded with the use of zircon-coated sand (No. 7 sand containing 2% by weight of phenolic resin).

The test piece was immersed in the aforementioned binder of Example 5 in an enclosed condition for 30 minutes, take out of the binder, drained for 5 minutes and dried at 80° C. for 60 minutes without hydrolysis.

The test piece thus obtained was placed in a firing furnace maintained at 1,000° C., fired at 1,000° C. for 1 hour, allowed to cool to room temperature, taken out of the furnace and tested for its deflective strength, which was 58 kg/cm$^2$. The deflective strength was determined in accordance with JIS-K-6910. The size of the test piece was as given above.

Comparative Example 1

Into an enclosable mixer was introduced 300 g of No. 3 water glass (SiO$_2$ 28.8% by weight, Na$_2$O 9.26%, by weight), 700 g of water was added and the mixture was agitated with a stirrer for 30 minutes to yield a binder of Comparative Example 1.

The concentrations of SiO$_2$ and Na$_2$O in the binder of Comparative Example 1 were 8.64% by weight and 2.8% by weight respectively.

A test piece, the same as that used in the aforementioned Example 2, was impregnated with the binder of Comparative Example 1 as in Example 2, the test piece was placed in a vacuum container at 600 mmHg for 30 minutes, CO$_2$ gas was introduced to the container until the pressure became normal to allow the binder to infiltrate the test piece and cure and the test piece was dried at 80° C. for 60 minutes.

The test piece thus obtained was tested for its dimensional change and deflective strength as in Example 3.

The test piece showed partial deformation and a deflective strength of 6 kg/cm$^2$.

What is claimed is:

1. A refractory molded article which comprises a molded matrix of an aggregate and a first binder, impregnated with a second higher temperature binder comprising an alcoholic solvent containing:

1 to 50% by weight, as converted to metal oxide, of one or more alcohol-soluble metal or metalloid alkoxides represented by the following general formulae $$R_mM^1(OR)_{4-m}$$

or $$M^2(OR)_3,$$

wherein $M^1$ designates an element of Group 4A or Group 4B excepting carbon of the periodic table, $M^2$ designates an element of Group 3A or Group 3B of the periodic table, R designates mutually identical or different alkyl group with 1 to 6 carbon atoms, aryl group with 6 to 8 carbon atoms, alkoxyalkyl group with 2 to 6 carbon atoms or aryloxyalkyl group with 7 to 12 carbon atoms, m is an integer from 0 to 3 when $M^1$ is Si and m is zero when $M^1$ is other than Si, or hydrolysates of said alcohol-soluble metal or metalloid alkoxides; and 1 to 16% by weight, as converted to metal oxide, of an alcohol-soluble alkaline compound represented by the following general formulae $$M^3OR'$$

or $$M^4(OR')_2,$$

wherein $M^3$ designates alkali metal, $M^4$ designates alkaline earth metal and R' designates hydrogen or alkyl group with 1 to 6 carbon atoms, as binder components.

2. The refractory molded article as described in claim 1 wherein said metal or metalloid alkoxide is one or more silicate esters or alkylsilicate esters selected from alkoxysilanes and their partial hydrolysates.

3. The refractory molded article according to claim 1, wherein said silicate esters are alkoxysilanes or aryloxysilanes.

4. The refractory molded article according to claim 2, wherein said alkylsilicate esters are alkyltrialkoxysilanes, dialkyldialkoxysilanes, trialkylalkoxysilanes or alkylaryloxysilanes.

5. The refractory molded article according to claim 1, wherein said first binder is an organic binder.

6. The refractory molded article according to claim 1, wherein said first binder is an inorganic binder.

7. The refractory molded article according to claim 1, wherein the content of said metal or metalloid alkoxides is from 4 to 30% by weight.

8. The refractory molded article according to claim 1, which has a strength of 10 kg/cm² or more.

9. The refractory molded article according to claim 1, wherein said aggregate is one or more of siliceous sand, alumina, quartz, zircon, fused silica, silica flower, mullite, synthetic mullite, chamotte or synthetic chamotte.

10. The refractory molded article according to claim 1, wherein said article is a mold or a core.

11. The refractory molded article according to claim 1, wherein said article is an ornament.

12. A refractory molding composition which comprises an aggregate;

a first binder for refractory molding; and a second higher temperature binder for refractory molding comprising an alcoholic solvent containing:

1 to 50% by weight, as converted to metal oxide, of one or more alcohol-soluble metal or metalloid alkoxides represented by the following general formulae $$R_mM^1(OR)_{4-m}$$

or $$M^2(OR)_3,$$

wherein $M^1$ designates an element of Group 4A or Group 4B excepting carbon of the periodic table, $M^2$ designates an element of Group 3A or Group 3B of the periodic table, R designates mutually identical or different alkyl group with 1 to 6 carbon atoms, aryl group with 6 to 8 carbon atoms, alkoxyalkyl group with 2 to 6 carbon atoms or aryloxyalkyl group with 7 to 12 carbon atoms, m is an integer from 0 to 3 when $M^1$ is Si and m is zero when $M^1$ is other than Si, or hydrolysates of said alcohol-soluble metal or metalloid alkoxides; and 1 to 16% by weight, as converted to metal oxide, of an alcohol-soluble alkaline compound represented by the following general formulae $$M^3OR'$$

or $$M^4(OR')_2,$$

wherein $M^3$ designates alkali metal, $M^4$ designates alkaline earth metal and R' designates hydrogen or alkyl group with 1 to 6 carbon atoms, as binder components.

13. The refractory molding composition according to claim 12, wherein said metal or metalloid alkoxide is one or more silicate esters or alkylsilicate esters selected from alkoxysilanes and their partial hydrolysates.

14. The refractory molding composition according to claim 13, wherein said silicate esters are alkoxysilanes or aryloxysilanes.

15. The refractory molding composition according to claim 13, wherein said alkylsilicate esters are alkyltrialkoxysilanes, dialkyldialkoxysilanes, trialkylalkoxysilanes or alkylaryloxysilanes.

16. The refractory molding composition according to claim 12, wherein said first binder is an organic binder.

17. The refractory molding composition according to claim 12, wherein said first binder is an inorganic binder.

18. The refractory molding composition according to claim 12, wherein the content of said metal or metalloid alkoxides is from 4 to 30% by weight.

19. The refractory molding composition according to claim 12, wherein said aggregate is one or more of siliceous sand, alumina, quartz, zircon, fused silica, silica flower, mullite, synthetic mullite, chamotte or synthetic chamotte.

20. The refractory molding composition according to claim 12, wherein said alkali metal is selected from the group consisting of lithium, sodium or potassium.

21. The refractory molding composition according to claim 12, wherein said alcohol-soluble alkaline compound is a sodium alcoholate or sodium hydroxide.

* * * * *